US006967230B2

(12) United States Patent
Hottovy et al.

(10) Patent No.: US 6,967,230 B2
(45) Date of Patent: Nov. 22, 2005

(54) PROCESS FOR PRODUCING POLYOLEFINS

(75) Inventors: John D. Hottovy, Bartlesville, OK (US); Michael C. Carter, League City, TX (US); Robert W. Bohmer, Kingwood, TX (US); Scott E. Kufeld, Houston, TX (US); David H. Burns, Houston, TX (US); Donald W. Verser, Houston, TX (US); Ragayan Vaidyanathan, Evansville, IN (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 682 days.

(21) Appl. No.: 09/923,751

(22) Filed: Aug. 7, 2001

(65) Prior Publication Data

US 2004/0230031 A1 Nov. 18, 2004

Related U.S. Application Data

(63) Continuation-in-part of application No. 09/213,147, filed on Dec. 18, 1998, now abandoned.

(51) Int. Cl.[7] .................................................. C08F 2/06

(52) U.S. Cl. .......................... 526/64; 526/352; 526/82; 526/84; 526/90

(58) Field of Search ............................ 526/64, 352, 82, 526/84, 90

(56) References Cited

U.S. PATENT DOCUMENTS

| | | | | |
|---|---|---|---|---|
| 3,152,872 A | | 10/1964 | Scoggin et al. | 34/15 |
| 3,817,962 A | | 6/1974 | Smith et al. | 260/88.2 |
| 3,998,995 A | | 12/1976 | Buss et al. | 526/59 |
| 4,121,029 A | | 10/1978 | Irvin et al. | 526/64 |
| 4,151,122 A | | 4/1979 | McDaniel et al. | 252/458 |
| 4,182,810 A | | 1/1980 | Willcox | 526/64 |
| 4,276,191 A | | 6/1981 | Karayannis et al. | 252/429 |
| 4,296,001 A | | 10/1981 | Hawley | 252/458 |
| 4,345,055 A | | 8/1982 | Hawley | 526/96 |
| 4,364,842 A | | 12/1982 | McDaniel et al. | 252/430 |
| 4,402,864 A | | 9/1983 | McDaniel | 252/430 |
| 4,424,341 A | | 1/1984 | Hanson et al. | 528/501 |
| 4,501,885 A | | 2/1985 | Sherk et al. | 528/501 |
| 4,613,484 A | | 9/1986 | Ayres et al. | 422/132 |
| 4,958,006 A | * | 9/1990 | Bernier et al. | 528/501 |
| 5,183,866 A | | 2/1993 | Hottovy | 526/88 |
| 5,200,502 A | | 4/1993 | Kao et al. | 528/494 |
| 5,207,929 A | | 5/1993 | Sung et al. | 210/774 |
| 5,237,025 A | | 8/1993 | Benham et al. | 526/114 |
| 5,387,659 A | | 2/1995 | Hottovy et al. | 526/59 |
| 5,442,019 A | | 8/1995 | Agapiou et al. | 526/82 |
| 5,731,381 A | | 3/1998 | Apecetche et al. | 526/83 |

* cited by examiner

*Primary Examiner*—William K. Cheung
(74) *Attorney, Agent, or Firm*—Williams, Morgan & Amerson, P.C.

(57) ABSTRACT

A process is provided that produces polyolefins.

16 Claims, 3 Drawing Sheets

PROCESS FOR PRODUCING POLYOLEFINS

This application is a Continuation In Part (CIP) of application Ser. No. 09/213,147 filed Dec. 18, 1998, now abn.

FIELD OF INVENTION

This invention is related to the field of processes that produce polyolefins.

BACKGROUND OF THE INVENTION

Production of polyolefins is a large industry throughout the world producing billions of pounds of polyolefins each year. Improvements in these processes can save millions of dollars in production costs. Producers of polyolefins spend millions of dollars to research ways to decrease production costs. This is because of the vast economies of scale possible in these processes. That is, reducing production costs by a penny per pound can save large sums of money. For example, if all producers of polyolefins that comprised polymerized ethylene could reduce production costs by a penny per pound, this would produce a savings of about 800,000,000 dollars.

Currently, silos can be required in order to provide storage for polyolefins if downstream equipment, such as, for example, an extruder, is experiencing operational or process control problems. By utilizing silos, the production of polyolefins can continue while the downstream equipment is being repaired or process control problems are being corrected. Silos are also utilized to blend off-specification polyolefins with on- specification polyolefins to make a suitable polyolefin product. Silos and their associated equipment, such as, for example, a polyolefin transfer system, can require an extensive capital investment during construction. In addition, the maintenance and energy costs for these processes are also costly.

This invention provides a solution to minimize the capital, maintenance, and energy costs of polyolefin production by eliminating a need for silos and their associated equipment.

SUMMARY OF INVENTION

It is an object of this invention to provide a process to produce at least one polyolefin.

It is another object of this invention to provide an apparatus to perform the process of producing at least one polyolefin.

In accordance with this invention, a process is provided comprising (or optionally, "consisting essentially of", or "consists of"):

(1) mixing Stream 1 with Stream 2 to produce Stream 3;
  - wherein said mixing occurs in Mixing Zone One (100);
  - wherein Stream 1 comprises at least one catalyst deactivating agent;
  - wherein Stream 2 comprises a reaction mixture;
    - wherein said reaction mixture comprises at least one polyolefin, at least one catalyst, at least one diluent, and at least one monomer;
  - wherein Stream 3 comprises at least one polyolefin, at least one deactivated catalyst, at least one diluent, and at least one monomer;

(2) transporting at least a portion of Stream 3 from said Mixing Zone One (100) through Stream Zone 1 (200) and to Separating Zone One (300);

(3) separating Stream 3 in said Separating Zone One (300) into Stream 4 and Stream 5;
  - wherein said Stream 4 comprises a polyolefin lean stream
  - wherein the majority of said Stream 4 comprises at least one diluent;
  - wherein said Stream 5 comprises a polyolefin rich stream wherein the majority of said Stream 5 comprises at least one polyolefin;

(4) transporting Stream 5 from said Separating Zone One (300) through a Stream Zone 3 (500) to an Agglomerating Zone One (600);

(5) agglomerating Stream 5 in said Agglomerating Zone One (600) to produce a Stream 6, wherein Stream 6 comprises at least one agglomerated polyolefin;

(6) transporting Stream 6 from said Agglomerating Zone One (600) through Stream Zone 4 (700) to a Product Recovery Zone (not depicted).

In accordance with this invention, an apparatus to perform the process of producing at least one polyolefin is provided.

DETAILED DESCRIPTION OF INVENTION

Figure 1:
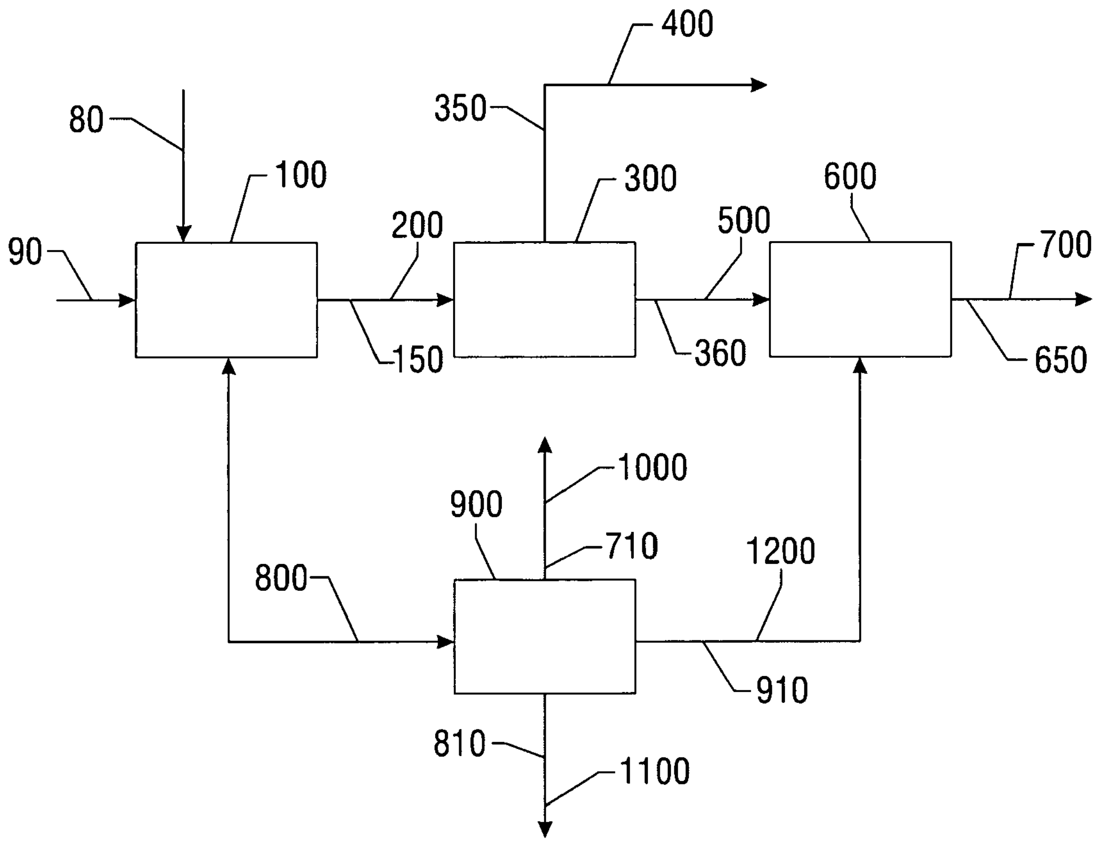
FIG. 1 discloses a diagram of one embodiment of this invention.

An embodiment of this invention, depicted in FIG. 1, comprises the following steps:

Step 1 is mixing Stream 1 (80) with Stream 2 (90) to produce Stream 3 (150) wherein said mixing occurs in Mixing Zone One. Mixing Zone One (100) can be any reactor that can perform a slurry polymerization. However, it is preferred that Mixing Zone One (100) is selected from the group consisting of a loop reactor and a stirred tank. Preferably, Mixing Zone One (100) comprises a loop reactor, as described in U.S. Pat. Nos. 4,121,029 and 4,424,341, which are incorporated by reference. Generally, in said loop reactor, at least one catalyst, at least one diluent, and at least one monomer are added continuously to and are moved continuously through said loop reactor. The monomers polymerize and form particulates, and said particulates are suspended in said polymerization reaction mixture.

The temperature in Mixing Zone One (100) is such that substantially all of the polyolefin produced is insoluble in said diluent. The polymerization temperature depends on the diluent chosen and generally is in the range of about 30° C. to about 120° C. The temperature should be below about 120° C. to prevent the polyolefin from dissolving or melting in said diluent. In ethylene polymer production, the temperature should be in the range of about 65° C. to about 110° C., in order to more efficiently produce ethylene polymer.

The pressure employed in said Mixing Zone One (100) is that which is sufficient to maintain the diluent substantially in the liquid phase. Normally, said pressure ranges from about 100 psia to about 2000 psia. In ethylene polymer production, said pressure in Mixing Zone One (100) ranges from about 500 psia to about 700 psia, in order to optimally produce ethylene polymer.

Stream 1 can be introduced into said Mixing Zone One (100) by any means known in the art. For example, Stream 1 can be allowed to gravity flow or to be pressured into Mixing Zone One (100). Said deactivating agent may be introduced into Mixing Zone One (100) at a single location or multiple locations on said Mixing Zone One (100). Preferably, said deactivating agent is introduced in one location allowing a longer time for deactivation of said catalyst. When said catalyst is deactivated too quickly, less than approximately 5 minutes, the temperature in said Mixing Zone One (100) significantly decreases causing the pressure to decrease also. This can cause an upset in operating conditions in said Mixing Zone One (100).

The amount of deactivating agent employed depends on the type of catalyst used. Optimally, the amount of deactivating agent is that which will substantially stop the polymerization reaction but not so much as to require the use of a scavenger, such as for example, diethyl zinc, to be utilized to remove catalyst poisons. Generally, the amount of deactivating agent utilized ranges from about $10^{-12}$ moles of deactivating agent per mole of catalyst to about $10^3$ moles of deactivating agent per mole of catalyst. Preferably, the amount of deactivating agent utilized ranges from about $10^{-6}$ moles of deactivating agent per mole of catalyst to about $10^2$ moles of deactivating agent per mole of catalyst. More preferably, the amount of deactivating agent utilized ranges from about $10^{-3}$ moles of deactivating agent per mole of catalyst to about 10 moles of deactivating agent per mole of catalyst. Most preferably, 0.10 moles of deactivating agent per mole of catalyst to 5 moles of deactivating agent per mole of catalyst are utilized.

By utilizing said deactivating agent in this invention, polymerization can be slowed, or substantially stopped, when downstream equipment is being repaired or process control problems are being corrected. Then, polymerization can be restarted. The term "restarted" means to re-establish the polymerization reaction after the deactivated agent substantially deactivates the catalyst. Preferably, when polymerization is slowed or stopped by said deactivating agent, a portion of the polyolefin is circulated out of the slurry polymerization reactor prior to restarting polymerization. While the polyolefin is being circulated out of the slurry polymerization reactor, the pressure in the reactor is maintained by the addition of diluent or monomer or both. To restart the polymerization, catalyst is added to the slurry polymerization reactor. Preferably, polymerization is restarted in about 2 to about 6 hours, most preferably, in 3 to 4 hours. This invention allows for minimal time to restart polymerization since polymerization can be restarted without the use of scavengers to remove poisons from the slurry polymerization reactor.

The use of said deactivating agent provides a method to shut down polyolefin production thus minimizing the amount of polyolefins produced that do not meet quality specifications. This process is superior to other methods of slowing or substantially stopping polyolefin production, such as, decreasing or stopping catalyst feed to the slurry polymerization reactor. Decreasing catalyst feed causes production of larger amounts of polyolefins that do not meet quality specifications. Using this invention, the polymerization reaction in a slurry polymerization reactor can be slowed or substantially stopped by using said deactivating agent, and the melt index of the polyolefins produced can still meet product specifications.

By utilizing this invention, silos and their associated equipment can be eliminated from the polyolefin process. Therefore, Separating Zone One (300) comprising at least one flash chamber and said Agglomerating Zone One (600) comprising at least one extruder can be directly connected or "closed-coupled", rather than said polyolefin being transported to silos prior to agglomerating. For example, when utilizing the inventive, closed-coupled slurry polymerization process, if an extruder is not functional, the slurry polymerization reactor also must be shut down since no storage silos are available. However, when this invention is utilized, polyolefin production is minimized and the polyolefin quality is optimized. By eliminating these storage silos and related equipment, an estimated cost savings of about 20,000,000 dollars to about 100,000,000 dollars can be obtained based on construction of a 2,000,000,000 pound/yr polyolefin polymerization plant. Most preferably, said transition metal is selected from the group comprising titanium, vanadium, chromium, and zirconium. Catalysts utilized to polymerize monomers to produce said polyolefin are described in U.S. Pat. Nos. 4,151,122, 4,296,001, 4,345,055, 4,364,842, 4,402,864, and 5,237,025, which are hereby incorporated by reference.

Said diluent is a compound in which the produced polyolefin is substantially, or entirely, insoluble. Suitable examples of diluents are isobutane, butane, propane, isopentane, hexane, and neohexane. Preferably, said diluent comprises isobutane, due to availability and ease of use.

In some cases, the diluent and the monomer utilized are the same chemical compound. For example, in a bulk polymerization to produce polypropylene, propylene is considered to be both the monomer and the diluent.

Stream 3 comprises at least one polyolefin, at least one deactivated catalyst, at least one diluent, and at least one monomer. Said polyolefin and diluent were described previously in this disclosure. Said deactivated catalyst comprises at least one catalyst described previously, but said catalyst has been substantially deactivated by said deactivating agent. Said deactivated catalyst is substantially unable to polymerize monomers to produce said polyolefin under the polymerization conditions in Mixing Zone One (100).

Said Mixing Zone One (100) can be any reactor that can perform a slurry polymerization. However, it is preferred that said Mixing Zone One (100) is selected from the group consisting of a loop reactor and stirred tank. Preferably, said Mixing Zone One (100) comprises a loop reactor, as described in U.S. Pat. Nos. 4,121,029 and 4,424,341, which are hereby incorporated by reference. Generally, in said loop reactor, at least one catalyst, at least one diluent, and at least one monomer are added continuously to and are moved continuously through said loop reactor. The monomers polymerize and form particulates, and said particulates are suspended in said polymerization reaction mixture.

The temperature in said Mixing Zone One (100) is such that substantially all of the polyolefin produced is insoluble in said diluent. The polymerization temperature depends on the diluent chosen and generally is in the range of about 30° C. to about 120° C. The temperature should be below about 120° C. to prevent the polyolefin from dissolving or melting in said diluent. In ethylene polymer production, the temperature should be in the range of about 65° C. to about 110° C., in order to more efficiently produce ethylene polymer.

The pressure employed in said Mixing Zone One (100) is that which is sufficient to maintain the diluent substantially in the liquid phase. Normally, said pressure ranges from about 100 psia to about 2000 psia. In ethylene polymer production, said pressure in said Mixing Zone One (100) ranges from about 500 psia to about 700 psia, in order to optimally produce ethylene polymer.

Step 2 is transporting at least a portion of Stream 3 (150) from said Mixing Zone One (100) through a Stream Zone 1 (200) and to a Separating Zone One (300).

Stream Zone 1 (200) connects, in fluid-flow communication, said Mixing Zone One (100) with said Separating Zone One (300).

A portion of Stream 3 is transported from said Mixing Zone One (100) by any means known in the art. For example, said portion of Stream 3 can be transported from said Mixing Zone One (100) either continuously or intermittently by the use of takeoff lines. U.S. Pat. No. 4,613,484 discloses takeoff lines and is hereby incorporated by reference.

Step 3 is separating Stream 3 in said Separating Zone One (300) into Stream 4 (350) and Stream 5 (360).

Said Stream 4 comprises a polyolefin lean stream wherein the majority of said Stream 4 comprises at least one diluent. Stream 4 can also further comprise at least one monomer. Said Stream 5 comprises a polyolefin rich stream wherein the majority of said Stream 5 comprises at least one polyolefin. Stream 5 can also further comprise at least one monomer and at least one diluent. Said diluent, monomer, and polyolefin were previously discussed in this disclosure.

Said Separating Zone One (300) can be any type of means to separate Stream 3 into Stream 4 and Stream 5. Generally, said Separating Zone One (300) comprises at least one flash chamber. Single or sequential flash chambers can be employed in this invention. The pressure in said flash chambers ranges from about 25 psia to about 400 psia. Flash chambers are disclosed in U.S. Pat. No. 3,152,872, which is hereby incorporated by reference.

Step 4 is transporting Stream 5 from said Separating Zone One (300) through a Stream Zone 3 (500) to an Agglomerating Zone One (600).

Stream Zone 3 (500) connects, in fluid-flow communication, said Separating Zone One (300) with said Agglomerating Zone One (600).

Step 5 is agglomerating Stream 5 in said Agglomerating Zone One (600) to produce a Stream 6 (650), wherein Stream 6 comprises at least one agglomerated polyolefin.

Agglomerating Stream 5 can be accomplished by any methods known in the art depending upon the polyolefin being agglomerated For example, extruders can be utilized to agglomerate Stream 5. The design of said extruders varies depending on the type of polyolefin being agglomerated. Said extruder can be selected from the group consisting of single screw extruders, multiscrew extruders, rotary extruders, and ram extruders. Further information on agglomeration of said polyolefin can be found in the PLASTICS ENGINEERING HANDBOOK OF THE SOCIETY OF THE PLASTICS INDUSTRY, 1991, pages 79–132.

Other components can be also be blended with Stream 5 prior to or during agglomeration. For example, antifogging agents, antimicrobial agents, coupling agents, flame retardants, forming agents, fragrances, lubricants, mold release agents, organic peroxides, smoke suppressants, and heat stabilizers. Further information on these compounds can be found in MODERN PLASTICS ENCYCLOPEDIA, 1992, pages 143–198.

Step 6 is transporting Stream 6 from said Agglomerating Zone One (600) through a Stream Zone 4 (700) to a Product Recovery Zone (not depicted).

Stream Zone 4 (700) connects, in fluid-flow communication, said Agglomerating Zone One(600) with said Product Recovery Zone (not depicted). Said Product Recovery Zone can comprise downstream equipment placed after the extruder.

Figure 2:
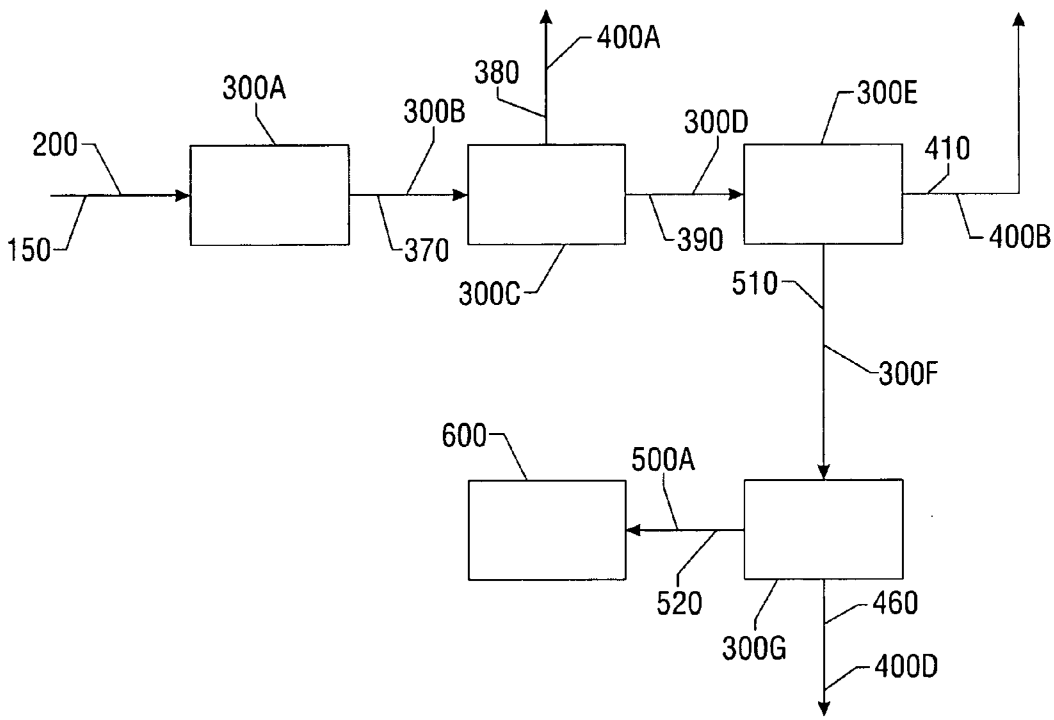
FIG. 2 discloses a diagram of a preferred embodiment of Separating Zone One (300).

A preferred embodiment of said Separating Zone One (300) comprises a Heating Zone One (300A), a High Pressure Zone (300C), a Low Pressure Zone (300E), and a Purge Zone One (300G) as depicted in FIG. 2. The separation in said Separating Zone One comprises the following process steps:

(3.1) heating Stream 3 (150) in Heating Zone One (300A) producing Stream 3A (370);

(3.2) transporting Stream 3A from said Heating Zone One (300A) through Stream Zone 1A (300B) to a High Pressure Separating Zone (300C);

(3.3) separating Stream 3A in said High Pressure Separating Zone (300C) to produce Stream 4A (380) and Stream 5A (390);
 wherein said Stream 4A comprises a polyolefin lean stream
 wherein the majority of said Stream 4A comprises at least one diluent;
 wherein said Stream 5A comprises a polyolefin rich stream
 wherein the majority of said Stream 5A comprises at least one polyolefin;

(3.4) transporting Stream 5A from said High Pressure Separating Zone (300C) through Stream Zone 1B (300D) to a Low Pressure Separating Zone (300E);

(3.5) separating Stream 5A in said Low Pressure Separating Zone (300E) to produce Stream 4B (410) and Stream 5B (510);
 wherein said Stream 4B comprises a polyolefin lean stream
 wherein the majority of said Stream 4B comprises at least one diluent;
 wherein said Stream 5B comprises a polyolefin rich stream
 wherein the majority of said Stream 5B comprises at least one polyolefin;

(3.6) transporting Stream 5B from said Low Pressure Separating Zone (300E) through Stream Zone IC (300F) to a Purge Zone One (300G);

(3.7) purging Stream 5B in said Purge Zone One (300G) with a gas to separate Stream 5B into Stream 4D (460) and Stream SC (520);
 wherein said Stream 4D comprises a polyolefin lean stream
 wherein the majority of said Stream 4D comprises said gas and at least one diluent;
 wherein said Stream 5C comprises a polyolefin rich stream
 wherein the majority of said Stream 5C comprises at least one polyolefin;

(3.8) transporting Stream 5C from said Purge Zone One (300G) through a Stream Zone 3A (500A) to an Agglomerating Zone One (600, as depicted in FIG. 1).

Step 3.1 in said Separating Zone One (300) is heating Stream 3 in said Heating Zone One (300A) producing Stream 3A. Heating Zone One (300A) comprises any means to heat Stream 3. Generally, said Heating Zone One (300A) comprises a flash line heater. The term "flash line heater" as used herein refers to a conduit the interior of which is heated. Typically, most flash line heaters are double pipe heat exchangers. At least one diluent in Stream 3 into is vaporized in an inner pipe utilizing the heat supplied from condensing steam in an annulus between an inner and outer pipe. U.S. Pat. Nos. 4,424,431 and 5,183,866 disclose flash line heaters, and are hereby incorporated by reference.

The exact heating conditions employed in said flash line heater will vary depending on the particular results desired and the particular polyolefin and diluent being processed. Generally, it is preferred to operate the flash line heater under conditions such that substantially all of said diluent in Stream 3 is vaporized over the time Stream 3 reaches the High Pressure Zone (300C). In ethylene polymer production, said flash line heater is at a temperature of about 30° C. to about 120° C., since this temperature range will allow most diluents to vaporize. A temperature above 120° C. can melt ethylene polymer, which can cause plugging of equipment. Preferably, in ethylene polymer processes, said flash line heater is at a temperature ranging from about 40° C. to about 100° C., since this temperature range is high enough to vaporize said diluent, but not to high to require a very long flash line heater which can increase construction and operational costs.

Generally, said flash line heater should operate at a pressure in the range of about 25 psia to about 400 psia since this pressure allows for efficient evaporation of said diluent. Preferably, for ethylene polymer processes, said flash line heater should operate within the range of about 135 psia to about 250 psia. When said flash line heater is operated in this range, said diluent can be condensed utilizing cooling water.

Steam 3A comprises at least one polyolefin and at least one diluent, wherein said diluent is in substantially a vapor phase.

Step 3.2 is transporting Stream 3A from said Heating Zone One (300A) through Stream Zone 1A (300B) to a High Pressure Separating Zone (300C). Stream Zone 1A (300B) connects, in fluid-flow communication, said Heating Zone One (300A) with said High Pressure Separating Zone (300C).

Step 3.3 is separating Stream 3A in said High Pressure Separating Zone (300C) to produce Stream 4A and Stream 5A. Said High Pressure Separating Zone (300C) comprises any means to separate Stream 3A. Generally, said High Pressure Separating Zone comprises a high pressure flash chamber. By utilizing a high pressure flash chamber, Stream 4A can be recycled without the need for compression prior to reuse. This lowers the capital cost of equipment when polyolefin plants are constructed.

The conditions maintained in said high pressure flash chamber can vary widely depending upon the results desired, the polyolefin being employed, and the diluent involved. Said high pressure flash chamber should operate at a temperature and pressure to allow separation of Stream 3A into Stream 4A and Stream 5A. Said Stream 4A comprises a polyolefin lean stream wherein the majority of said Stream 4A comprises at least one diluent. Said Stream 5A comprises a polyolefin rich stream wherein the majority of said Stream 5A comprises at least one polyolefin. Preferably, said high pressure flash chamber should operate at a pressure in the range of about 50 psia to about 400 psia, in order to efficiently separate Stream 3A. Preferably, said high pressure flash chamber should operate within the range of about 135 psia to about 250 psia so that compression of Stream 4A is not required.

Step 3.4 is transporting Stream 5A from said High Pressure Separating Zone (300C) through Stream Zone 1B (300D) to a Low Pressure Separating Zone (300E).

Stream Zone 1B (300F) connects, in fluid-flow communication, said High Pressure Separating Zone (300C) with said Low Pressure Separating Zone (300E).

Step 3.5 is separating Stream 5A in said Low Pressure Separating Zone (300E) to produce Stream 4B and Stream 5B. Said Stream 4B comprises a polyolefin lean stream wherein the majority of said Stream 4B comprises at least one diluent. Said Stream 5B comprises a polyolefin rich stream wherein the majority of said Stream 5B comprises at least one polyolefin.

Said Low Pressure Separating Zone (300C) comprises any means to separate Stream 5A. Generally, said Low Pressure Separating Zone (300C) comprises a low pressure flash chamber. Typically, said low pressure flash chamber should operate at a pressure in the range of about 0 psia to about 50 psia, preferably, within the range of about 2 psia to about 20 psia, in order to allow more efficient separation of said diluent and said monomer.

Step 3.6 is transporting Stream 5B from said Low Pressure Separating Zone (300E) through Stream Zone 1C (300F) to a Purge Zone One (300G).

Stream Zone 1C (300F) connects, in fluid-flow communication, said Low Pressure Separating Zone (300E) and said Purge Zone One (300G).

Step 3.7 is purging Stream 5B in said Purge Zone One (300G) with a gas to separate Stream 5B into Stream 4D and Stream 5C.

Purge Zone One (300G) comprises any means to separate Stream 5B. Generally, said Purge Zone One (300G) comprises a purge column utilized to separate Stream 5B into Stream 4D and Stream 5C. Said Stream 4D comprises a polyolefin lean stream wherein the majority of said Stream 4D comprises said gas and at least one diluent. Stream 4D can also further comprise at least one monomer. Said Stream 5C comprises a polyolefin rich stream wherein the majority of said Stream 5C comprises at least one polyolefin. Stream 5C can also further comprise at least one monomer and at least one diluent. Said diluent, monomer, and polyolefin were previously discussed in this disclosure.

A gas is utilized to remove said diluent and said monomer. It is preferable when said gas does not react with said monomer, diluent, or polyolefin. Preferably, said gas comprises nitrogen, due to availability and ease of use. The purge rate of said gas is that which will substantially separate said diluent and said monomer from said polyolefin.

Generally, said purge column is operated at a temperature sufficient to separate Stream 5B. For ethylene polymer processes, said purge column is operated at a temperature in the range of about 30° C. to about 120° C. A temperature greater than 120° C. can cause the ethylene polymer to melt, therefore causing plugging of the equipment.

Generally, said purge column is operated at a pressure in the range of about 0 psia to about 400 psia. Preferably, said purge column is operated at a pressure in the range of about 0 psia to about 5 psia, in order to facilitate removal of said diluent and said monomer.

Optionally, said purge column can be utilized to store polyolefin when downstream equipment is not operational.

Step 3.8 is transporting Stream 5C from said Purge Zone One (300G) through a Stream Zone 3A (500A) to an Agglomerating Zone One (600). Stream Zone 3A (500A) connects, in fluid-flow communication, said Purge Zone One (300G) with Agglomerating Zone One (600, as depicted in FIG. 1).

Figure 3:
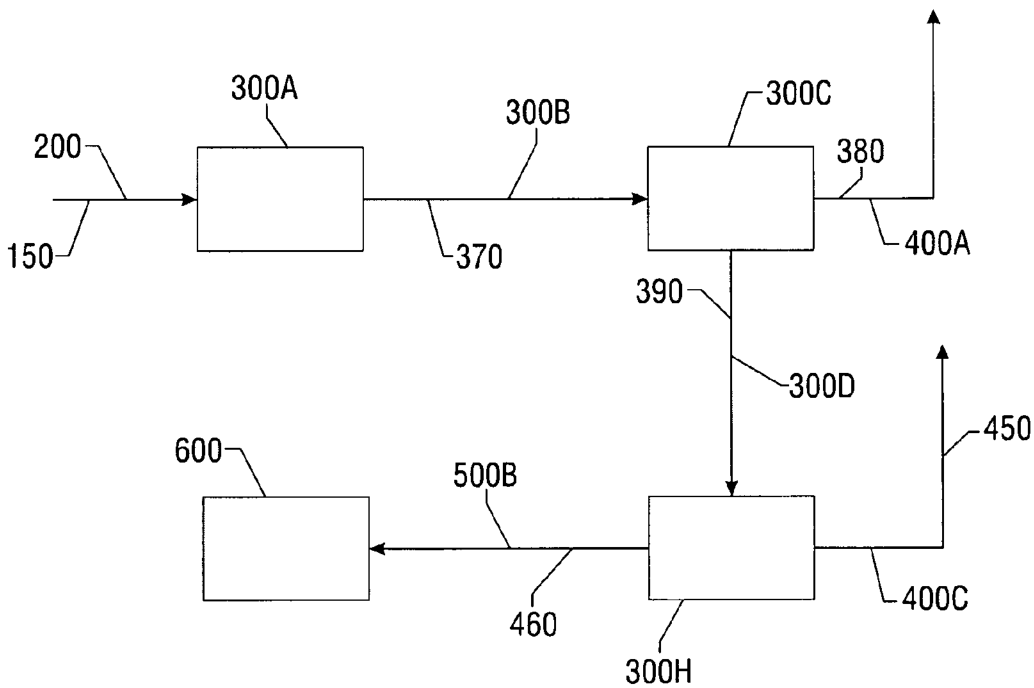
FIG. 3 discloses a diagram of a more preferred embodiment of Separating Zone One (300).

A more preferred embodiment of said First Separating Zone comprises a Heating Zone One (300A), a High Pressure Separating Zone (300C), and a Purge Zone Two (300H) as depicted in FIG. 3. The separation in said Separating Zone One comprises the following process steps:

(3.1) heating Stream 3 (150) in Heating Zone One (300A) producing Stream 3A (370);

(3.2) transporting Stream 3A from said Heating Zone One (300A) through Stream Zone 1A (300B) to a High Pressure Separating Zone (300C);

(3.3) separating Stream 3A in said High Pressure Separating Zone (300C) to produce Stream 4A (380) and Stream 5A (390);

wherein said Stream 4A comprises a polyolefin lean stream wherein the majority of said Stream 4A comprises at least one diluent;

wherein said Stream 5A comprises a polyolefin rich stream wherein the majority of said Stream 5A comprises at least one polyolefin;

(3.9) transporting Stream 5A from said High Pressure Separating Zone (300C) through Stream Zone 1B (300D) to a Purge Zone Two (300H);

(3.10) purging Stream 5A in said Purge Zone Two (300H) with a gas to separate Stream 5A into Stream 4C (450) and Stream 5D (460);

wherein said Stream 4C comprises a polyolefin lean stream wherein the majority of said Stream 4C comprises said gas and at least one diluent;

wherein said Stream 5D comprises a polyolefin rich stream wherein the majority of said Stream 5D comprises at least one polyolefin;

(3.11) transporting Stream 5D from said Purge Zone Two (300H) through a Stream Zone 3B (500B) to an Agglomerating Zone One (600, as depicted in FIG. 1).

Steps 3.1, 3.2, and 3.3 have been previously described.

Step 3.9 is transporting Stream 5A from said High Pressure Separating Zone (300C) through Stream Zone 1B (300D) to a Purge Zone Two 16 (300H). Stream Zone 1B (300D) connects in fluid flow communication said High Pressure Separating Zone (300C) and said Purge Zone Two (300H).

Step 3.10 is purging Stream 5A in said Purge Zone Two (300H) with a gas to separate Stream 5A into Stream 4C and Stream 5D.

Purge Zone Two (300H) comprises any means to separate Stream 5A. Generally, said Purge Zone Two (300H) comprises a purge column utilized to separate Stream 5A into Stream 4C and Stream 5D. Said purge column was previously discussed in this disclosure. Said Stream 4C comprises a polyolefin lean stream wherein the majority of said Stream 4C comprises said gas and at least one diluent. Stream 4C can also further comprise at least one monomer. Said Stream 5D comprises a polyolefin rich stream wherein the majority of said Stream 5D comprises at least one polyolefin. Stream 5D can also further comprise at least one monomer and at least one diluent. Said diluent, monomer, and polyolefin were previously discussed in this disclosure.

Step 3.11 is transporting Stream 5D from said Purge Zone Two (300H) through a Stream Zone 3B (500B) to an Agglomerating Zone One (600, as depicted in FIG. 1). Stream Zone 3B (500B) connects, in fluid-flow communication, said Purge Zone Two (300H) with Agglomerating Zone One (600, as depicted in FIG. 1).

In this more preferred embodiment, the Low Pressure Separating Zone (300E, as depicted in FIG. 2) has been eliminated. Adequate separation of said diluent and said monomer from said polyolefin is achieved in said High Pressure Separating Zone (300C) and said Purge Zone Two (300H). This embodiment is preferred since the capital cost of construction can be decreased since Low Pressure Separating Zone (300E, as depicted in FIG. 2) equipment is not required.

Optionally, said Separation Zone One (300) can also further comprise an Alternate Separating Zone (900), wherein Stream 3 can be diverted when said Separating Zone One (300) is not operational or when Stream 3 does not meet quality specifications. The Alternate Separating Zone is depicted in FIG. 1.

Said Alternate Separating Zone (900) comprises the following process steps:

(3.12) transporting at least a portion of Stream 3 from said Mixing Zone One (100) through Stream Zone 5 (800) to said Alternate Separating Zone (900);

(3.13) separating Stream 3 in said Alternate Separating Zone (900) into Stream 7 (710), Stream 8 (810), and Stream 9 (910);

wherein Stream 7 comprises a polyolefin lean stream wherein a majority of said Stream 7 comprises at least one diluent;

wherein Stream 8 comprises a polyolefin rich stream wherein a majority of said Stream 8 comprises at least one polyolefin not suitable for agglomerating; and wherein Stream 9 comprises a polyolefin rich stream wherein a majority of said Stream 9 comprises at least one polyolefin suitable for agglomerating;

(3.14) transporting Stream 9 from said Alternate Separating Zone (900) through Stream Zone 8 (1200) to said Agglomerating Zone One (600).

Step 3.12 in said Alternate Separating Zone (900) is transporting at least a portion of Stream 3 from said Mixing Zone One (100) through Stream Zone 5 (800) to said Alternate Separating Zone (900). Said Stream Zone 5 (800) connects, in fluid-flow communication, said Mixing Zone One (100) and Alternate Separating Zone (900).

A portion of Stream 3 is transported from said Mixing Zone One (100) by any means known in the art. For example, said portion of Stream 3 can be transported from said Mixing Zone One (100) either continuously or intermittently by the use of takeoff lines as previously discussed.

Step 3.13 in said Alternate Separating Zone (900) is separating Stream 3 in said Alternate Separating Zone (900) into Stream 7, Stream 8, and 14) Stream 9. Said Alternate Separating Zone can be any type of means to separate said Stream 3 into Stream 7, Stream 8, and Stream 9. Generally, said Alternate Separating Zone (900) comprises at least one alternate flash chamber. Generally, said Alternate Separating Zone (900) is operated at a pressure in the range of about 0 psia to about 400 psia. Preferably, said Alternative Separating Zone is operated at a pressure in the range of about 0 psia to about 30 psia, in order to efficiently separate said Stream 3.

Stream 7 comprises a polyolefin lean stream wherein the majority of said Stream 7 comprises at least one diluent. Said Stream 7 can be recycled to said Mixing Zone One (100).

Stream 8 comprises a polyolefin rich stream wherein a majority of said Stream 8 comprises at least one polyolefin not suitable for agglomerating. Generally, Stream 8 has a melt flow index greater than 50 times the melt flow index of Stream 5 as measured in accordance with ASTM D 1238-86, Procedure B—Automatically Timed Flow Rate Procedure, Condition 316/5.0 modified to use a 5 minute preheat time.

Stream 9 comprises a polyolefin rich stream wherein a majority of said Stream 9 comprises at least one polyolefin suitable for agglomerating. Generally, Stream 9 has a melt flow index less than 50 times the melt flow index of Stream 5. Preferably, Stream 9 has a melt flow index less than about 5 to about 10 times the melt flow index of Stream 5. Most preferably, Stream 9 has a melt flow index less than about 2 to about 4 times the melt flow index of Stream 5.

Generally, said Alternate Separating Zone (900) is operated at the same temperature as said Separating Zone One (300) as previously discussed.

Since the Alternate Separating Zone (900) can be utilized for said polyolefin that does not meet quality specifications, said Alternate Separating Zone (900) should provide a means for transporting both said polyolefin suitable for agglomeration and polyolefin not suitable for agglomeration. Stream 8 is transported through Stream Zone 7 (1100) to a Waste Container Zone (not depicted). Stream Zone 7 (1100) connects, in fluid-flow communication, said Alternate Separating Zone (900) to a Waste Container Zone (not depicted). Generally, a valve is provided located near the bottom of said Alternate Separating Zone (900) to allow said polyolefin not suitable for agglomeration to be dumped to said Waste Container Zone (not depicted).

Step 3.14 is transporting Stream 9 from said Alternate Separating Zone (900) through Stream Zone 8 (1200) to said Agglomerating Zone One (600). Stream Zone 8 connects, in fluid-flow communication, said Alternate Separating Zone (900) and said Agglomerating Zone One (600).

That which is claimed is:

1. A process comprising:

(1) mixing Stream 1 with Stream 2 to produce Stream 3;
 wherein said mixing occurs in Mixing Zone One;
 wherein said Mixing Zone One comprises a slurry polymerization reactor selected from the group consisting of a loop reactor and a stirred tank;
 wherein Stream 1 comprises at least one catalyst deactivating agent;
 wherein Stream 2 comprises a reaction mixture;
  wherein said reaction mixture comprises at least one polyolefin, at least one catalyst, at least one diluent, and at least one monomer;
 wherein Stream 3 comprises at least one polyolefin, at least one deactivated catalyst, at least one diluent, and at least one monomer;

(2) transporting at least a portion of Stream 3 from said Mixing Zone One through Stream Zone 1 and to Separating Zone One;
 wherein said Separating Zone One comprises at least one flash chamber;

(3) separating Stream 3 in said Separating Zone One into Stream 4 and Stream 5;
 wherein said Stream 4 comprises a polyolefin lean stream wherein the majority of said Stream 4 comprises at least one diluent;
 wherein said Stream 5 comprises a polyolefin rich stream wherein the majority of said Stream 5 comprises at least one polyolefin;

(4) transporting Stream 5 from said Separating Zone One through a Stream Zone 3 to an Agglomerating Zone One;

(5) agglomerating Stream 5 in said Agglomerating Zone One to produce a Stream 6, wherein Stream 6 comprises at least one agglomerated polyolefin;

(6) transporting Stream 6 from said Agglomerating Zone One through Stream Zone 4 to a Product Recovery Zone.

2. A process according to claim 1 wherein said deactivating agent is selected from the group consisting of water, alcohols, and other oxygen-containing materials.

3. A processing according to claim 2 wherein said polyolefin is selected from the group consisting of homopolymers consisting essentially of polymerized monomers having from 2 to about 10 carbon atoms per molecule and copolymers comprising at least two different polymerized monomers having from 2 to about 16 carbon atoms per molecule.

4. A process according to claim 3 wherein said catalyst is selected from the group consisting of Ziegler-Natta catalysts, Phillips catalysts, and metallocene catalysts;
 wherein said catalysts comprise transition metals of Groups IVB–VIII of the Periodic Table of Elements.

5. A process according to claim 4 wherein said diluent is isobutane.

6. A process according to claim 5 wherein the amount of deactivating agent utilized ranges from about $10^{-6}$ moles of deactivating agent per mole of catalyst to about $10^{2}$ moles of deactivating agent per mole of catalyst.

7. A process according to claim 6 wherein said polyolefin is a homopolymer consisting essentially of polymerized ethylene.

8. A process according to claim 7 wherein said deactivating agent utilized ranges from about 0.10 moles of deactivating agent per mole of catalyst to about 5 moles of deactivating agent per mole of catalyst.

9. A process according to claim 8 wherein said deactivating agent is water.

10. A process according to claim 1 wherein said Separating Zone One comprises:

(3.1) heating Stream 3 in Heating Zone One producing Stream 3A;
 wherein said Heating Zone One comprises a flash line heater;

(3.2) transporting Stream 3A from said Heating Zone One through Stream Zone 1A to a High Pressure Separating Zone;
 wherein said High Pressure Separating Zone comprises at least one flash chamber;

(3.3) separating Stream 3A in said High Pressure Separating Zone to produce Stream 4A and Stream 5A;
 wherein said Stream 4A comprises a polyolefin lean stream;
 wherein the majority of said Stream 4A comprises at least one diluent;
 wherein said Stream 5A comprises a polyolefin rich stream;
 wherein the majority of said Stream 5A comprises at least one polyolefin;

(3.9) transporting Stream 5A from said High Pressure Separating Zone through Stream Zone 1B to a Purge Zone Two;

(3.10) purging Stream 5A in said Purge Zone Two with a gas to separate Stream 5A into Stream 4C and Stream 5D;
 wherein said Purge Zone Two comprises at least one purge column;
 wherein said Stream 4C comprises a polyolefin lean stream;
 wherein the majority of said Stream 4C comprises said gas and at least one diluent;
 wherein said Stream 5D comprises a polyolefin rich stream;
 wherein the majority of said Stream 5D comprise at least one polyolefin;

(3.11) transporting Stream 5D from said Purge Zone Two through a Stream Zone 3B to an Agglomerating Zone One.

11. A process according to claim 1 wherein said Separating Zone One comprises:

(3.1) heating Stream 3 in Heating Zone One producing Stream 3A;

wherein said Heating Zone One comprises at least one flash line heater;

(3.2) transporting Stream 3A from said Heating Zone One through Stream Zone 1A to a High Pressure Separating Zone;

(3.3) separating Stream 3A in said High Pressure Separating Zone to produce Stream 4A and Stream 5A;

wherein said High Pressure Separating Zone comprises at least one flash chamber;

wherein said Stream 4A comprises a polyolefin lean stream;

wherein the majority of said Stream 4A comprises at least one diluent;

wherein said Stream 5A comprises a polyolefin rich stream;

wherein the majority of said Stream 5A comprises at least one polyolefin;

(3.4) transporting Stream 5A from said High Pressure Separating Zone through Stream Zone 1B to a Low Pressure Separating Zone;

(3.5) further separating Stream 5A in said Low Pressure Separating Zone to produce Stream 4B and Stream 5B;

wherein said Low Pressure Separating Zone comprises at least one flash chamber;

wherein said Stream 4B comprises a polyolefin lean stream;

wherein the majority of said Stream 4B comprises at least one diluent;

wherein said Stream 5B comprises a polyolefin rich stream;

wherein the majority of said Stream 5B comprises at least one polyolefin;

(3.6) transporting Stream 5B from said Low Pressure Separating Zone through Stream Zone 1C to a Purge Zone One;

(3.7) purging Stream 5B in said Purge Zone One with a gas to separate Stream 5B into Stream 4D and Stream 5C;

wherein said Purge Zone One comprises at least one purge column;

wherein said Stream 4D comprises a polyolefin lean stream;

wherein the majority of said Stream 4D comprises said gas and at least one diluent;

wherein said Stream 5C comprises a polyolefin rich stream;

wherein the majority of said Stream 5C comprises at least one polyolefin;

(3.8) transporting Stream 5B from said Purge Zone One through a Stream Zone 3A to an Agglomerating Zone One.

wherein Stream 8 comprises a polyolefin rich stream wherein a majority of said Stream 8 comprises at least one polyolefin not suitable for agglomerating; and wherein Stream 9 comprises a polyolefin rich stream wherein a majority of said Stream 9 comprises at least one polyolefin suitable for agglomerating;

(3.14) transporting Stream 9 from said Alternate Separating Zone through Stream Zone 8 to said Agglomerating Zone One.

12. A process according to claim 1 wherein said Separation Zone One further comprises an Alternate Separating Zone.

13. A process according to claim 12 wherein said Alternate Separating Zone comprises the following process steps:

(3.12) transporting at least a portion of Stream 3 from said Mixing Zone One through Stream Zone 5 to said Alternate Separating Zone;

(3.13) separating Stream 3 in said Alternate Separating Zone into Stream 7, Stream 8, and Stream 9;

wherein Stream 7 comprises a polyolefin lean stream wherein a majority of said Stream 7 comprises at least one diluent;

wherein Stream 8 comprises a polyolefin rich stream wherein a majority of said Stream 8 comprises at least one polyolefin not suitable for agglomerating; and wherein Stream 9 comprises a polyolefin rich stream wherein a majority of said Stream 9 comprises at least one polyolefin suitable for agglomerating;

(3.14) transporting Stream 9 from said Alternate Separating Zone through Stream Zone 8 to said Agglomerating Zone One.

14. A process comprising:

introducing a catalyst deactivating agent into an olefin polymerization zone;

wherein said olefin polymerization zone comprises a slurry polymerization reactor selected from the group consisting of a loop reactor and a stirred tank;

thereafter passing polymerization zone effluent comprising deactivated catalyst, diluent and monomer to a separation zone;

wherein said separation zone comprises at least one flash chamber;

separating said polymerization zone effluent in said separation zone into a polyolefin lean stream comprising diluent and a polyolefin rich stream; and passing said polyolefin rich stream to an extrusion zone.

15. A process according to claim 14 wherein said polyolefin rich stream is passed directly from said separation zone to said extrusion zone.

16. A process according to claim 14 wherein said separation zone comprises a high pressure separating zone and wherein said polyolefin rich stream is passed directly from said high pressure separating zone to a purge zone and then directly to said extrusion zone.

* * * * *